(12) United States Patent
Terasaki et al.

(10) Patent No.: US 7,048,784 B2
(45) Date of Patent: May 23, 2006

(54) METHOD AND SYSTEM FOR TREATING EXHAUST GAS FROM CEMENT MANUFACTURING EQUIPMENT

(75) Inventors: Junichi Terasaki, Chiba (JP); Yasuhiro Uchiyama, Chiba (JP); Osamu Yamaguchi, Chiba (JP); Harutoshi Kidachi, Chiba (JP); Masafumi Nakazaki, Tokyo (JP); Kouji Kondou, Tokyo (JP)

(73) Assignee: Taiheiyo Cement Corporation, Tokyo (JP)

( * ) Notice: Subject to any disclaimer, the term of this patent is extended or adjusted under 35 U.S.C. 154(b) by 13 days.

(21) Appl. No.: 10/759,433

(22) Filed: Jan. 20, 2004

(65) Prior Publication Data

US 2004/0173096 A1    Sep. 9, 2004

(30) Foreign Application Priority Data

Jan. 22, 2003    (JP) .............................. 2003-013481

(51) Int. Cl.
*B01D 46/42* (2006.01)

(52) U.S. Cl. ..................... 95/271; 55/385.1; 55/466; 106/752

(58) Field of Classification Search ................. 95/271; 55/345, 385.1, 466; 432/14, 16; 106/752

See application file for complete search history.

(56) References Cited

U.S. PATENT DOCUMENTS 3,618,916 A * 11/1971 Giorgi ........................ 432/58
6,755,906 B1 * 6/2004 Jorget et al. ................. 106/752

FOREIGN PATENT DOCUMENTS

| JP | 7-138054 A | 5/1995 |
| JP | 9-52742 A | 2/1997 |
| JP | 11-19623 A | 1/1999 |
| JP | 11-246247 A | 9/1999 |
| JP | 2000-016844 A | 1/2000 |

* cited by examiner

*Primary Examiner*—Robert A. Hopkins
(74) *Attorney, Agent, or Firm*—Posz Law Group, PLC; R. Eugene Varndell, Jr.

(57) ABSTRACT

An exhaust gas treatment method including: (A) a step of treating exhaust gas from cement manufacturing equipment by using a dust collector 9 to collect dust containing chlorinated organic compounds, and discharging the exhaust gas after the treatment by the dust collector 9, and (B) a step of charging all or part of the dust collected by the dust collector 9 into a place (e.g. a rotary kiln 5, a pre-calciner 6, and a cyclone 4*d*) having a temperature of at least 800° C. inside the cement manufacturing equipment. The remainder of the dust from step (B) maybe charged into a place (e.g. a raw material supply passage 3) having a temperature below 800° C. inside the cement manufacturing equipment, provided the amount of the remainder to be charged is smaller than a certain amount. Chlorinated organic compounds such as dioxins in the exhaust gas can be decomposed efficiently to be made harmless, merely by including simple and low-cost means (e.g. a dust feeding means 12, etc.).

10 Claims, 1 Drawing Sheet

F I G. 1
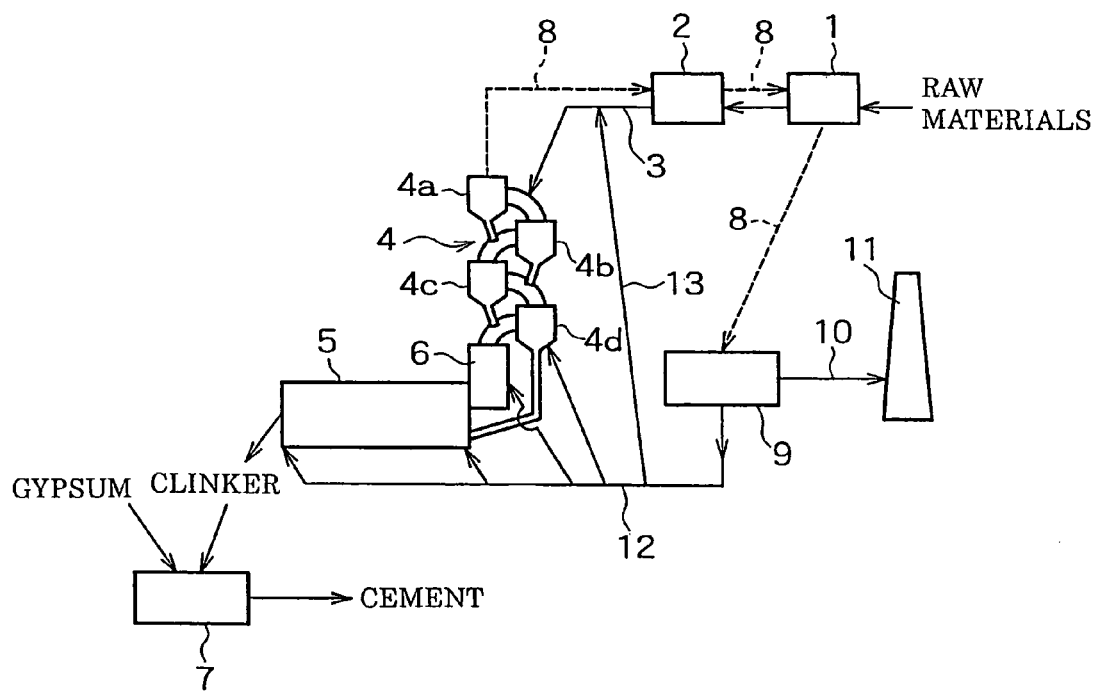

METHOD AND SYSTEM FOR TREATING EXHAUST GAS FROM CEMENT MANUFACTURING EQUIPMENT

BACKGROUND OF THE INVENTION

1. Field of the Invention

The present invention relates to a treatment method and a treatment system for decomposing and making harmless efficiently chlorinated organic compounds such as dioxins contained in exhaust gas from cement manufacturing equipment that uses incineration ash as part of the cement raw materials.

2. Description of the Related Art

In recent years, there have been an increase in occasions of using waste materials containing dioxins such as municipal refuse, soot (i.e. fly ash) and combustion residue (i.e. bottom ash) generated upon incinerating municipal refuse, sewage sludge, paper-making sludge, and molding sand as raw materials in cement manufacture.

Among these waste materials, municipal refuse, soot (i.e. fly ash) generated upon incinerating municipal refuse, sewage sludge, paper-making sludge and so on are charged into a pre-calciner or a rotary kiln that constitutes part of the cement manufacturing equipment, and hence are put under conditions under which the dioxins can be decomposed.

On the other hand, there are also some kinds of waste materials that are charged into a suspension preheater together with ordinary cement raw materials. Examples of such waste materials include coal ash, molding sand, combustion residue (i.e. bottom ash) generated upon incinerating municipal refuse. Dioxins contained in these waste materials may not be completely decomposed, and some dioxins may vaporize and remain in the exhaust gas.

Dioxins that are not decomposed and remain in a very small quantity in the exhaust gas are adsorbed onto the surface of dust contained in the exhaust gas as the temperature of the exhaust gas drops. The dust on which the dioxins have been adsorbed is then separated from the exhaust gas and collected by equipment installed in the gas flue such as a dust collector (e.g. electrostatic precipitator), a drier and a mill.

In this way, most of the dioxins generated during cement manufacture are decomposed or collected, and are not discharged out of the exhaust gas treating system.

However, dioxins that have not been adsorbed on the dust, and gaseous dioxins, are discharged into the atmosphere together with the exhaust gas, albeit in a very small quantity. The discharge concentration of these dioxins is sufficiently low, but it is desirable to continue striving for further reductions.

Under the circumstances, various arts for decomposing and making harmless the dioxins contained in exhaust gas of cement manufacturing equipmentes have been proposed.

For example, Japanese Patent Application Laid-open No. 2000-16844 discloses a method in which, when cement is manufactured by using incineration ash from municipal refuse or industrial waste material as part of the raw materials, kiln dust containing dioxins that have not yet been decomposed is collected, the collected kiln dust is heated to a temperature above the boiling points of the dioxins, and the gas containing the vaporized dioxins is introduced into a rotary kiln for clinker firing, whereby the dioxins are decomposed by the heat of the cement firing.

Also, Japanese Patent Application Laid-open No. H11 (1999)-246247 discloses a cement manufacturing equipment that is provided with firing and cooling equipment that fires raw materials including municipal refuse incineration ash or the like to produce cement clinker, exhaust gas treatment equipment that rapidly cools the exhaust gas generated from the firing and cooling equipment to suppress the resynthesis of dioxins and thus make the exhaust gas harmless, dioxin decomposing equipment that collects dust generated from the firing and cooling equipment and pyrolyzes the dioxins in the dust, and so on.

In the arts disclosed in Japanese Patent Application Laid-open No. 2000-16844 and Japanese Patent Application Laid-open No. H11 (1999)-246247 described above, dioxins contained in the dust in exhaust gas of the cement manufacturing equipment are treated using independent heating equipment provided separately to the equipment originally involved in the cement manufacture such as a rotary kiln. It would be convenient if dioxins in exhaust gas of cement manufacturing equipment could be treated efficiently without providing special heating equipment for treating the dioxins.

SUMMARY OF THE INVENTION

It is an object of the present invention to provide a treatment method and a treatment system according to which chlorinated organic compounds such as dioxins in exhaust gas of cement manufacturing equipment can be decomposed efficiently to be made harmless, merely by adding simple and low-cost equipment to the cement manufacturing equipment.

The present inventors carried out assiduous studies to attain the above object, and discovered that by charging dust containing chlorinated organic compounds such as dioxins, which has been collected from exhaust gas of cement manufacturing equipment, into a specific place in the cement manufacturing equipment, the chlorinated organic compounds can be decomposed efficiently to be made harmless without providing special heating means and so on. The present invention was thus accomplished.

Specifically, a method of treating exhaust gas of cement manufacturing equipment of the present invention comprises: (A) a step of treating exhaust gas from cement manufacturing equipment using dust collection means (e.g. a dust collector such as an electrostatic precipitator, a drier or mill capable of collecting dust, and so on) to collect dust containing chlorinated organic compounds such as dioxins, and discharging the exhaust gas after the treatment by the dust collection means; and (B) a step of charging at least part of the collected dust into a place having a temperature of at least 800° C. inside the cement manufacturing equipment (e.g. the lowest stage of a suspension preheater, a pre-calciner, the front portion or end portion of a rotary kiln, and so on)

According to the treatment method of the present invention, dust containing chlorinated organic compounds (e.g. dioxins) in exhaust gas of cement manufacturing equipment is put inside the cement manufacturing equipment under conditions (i.e. a high temperature of at least 800° C.) under which the chlorinated organic compounds (e.g. dioxins) can be pyrolyzed. As a result, the chlorinated organic compounds (e.g. dioxins) can be decomposed efficiently to be made harmless without providing special heating equipment for treating the chlorinated organic compounds.

It should be noted that exhaust gas from cement manufacturing equipment has been used conventionally as a heat source in a drying process and/or a pulverization process for cement raw materials, and dust in the exhaust gas, which has been collected in such a drying process and/or a pulverization process, can be a target of the treatment method of the present invention in the same way as dust collected by a dust collector such as an electrostatic precipitator.

The exhaust gas treatment method of the present invention may further comprise (C) a step of charging the remainder of the dust from step (B) into a place having a temperature below 800° C. inside the cement manufacturing equipment (e.g. a cement raw material supply passage on a raw material inlet side (i.e. exhaust gas outlet side) of the suspension preheater, and so on).

If such a constitution is adopted, then even in the case that it is difficult to charge all of the collected dust into a place having a temperature of at least 800° C., the amount of collected dust to be treated by the method of the present invention can be increased by charging part of the collected dust into a place having a temperature of at least 800° C., and charging the remainder of the collected dust into a place having a temperature below 800° C.

In the embodiment of the present invention including above-mentioned step (C), it is preferable to set the amount of the dust charged in step (B) to be such that, under conditions of supplying the dust continuously in each of step (B) and step (C), the concentration of chlorinated organic compounds (e.g. dioxins) in the exhaust gas after the treatment by the dust collection means decreases with the lapse of time.

If such a constitution is adopted, then the collected dust containing chlorinated organic compounds (e.g. dioxins) can be treated to be made harmless merely by using existing heating means of the cement manufacturing equipment without increasing the amount of chlorinated organic compounds (e.g. dioxins) discharged into the atmosphere with the lapse of time.

In other words, even if part of the collected dust is charged into a place having a low temperature (i.e. below 800° C.) such as a cement raw material supply passage located on the raw material inlet side (i.e. the downstream side of the exhaust gas) of the suspension preheater, the chlorinated organic compounds (e.g. dioxins) circulate in the exhaust gas treatment system without increasing its concentration, and the concentration of the chlorinated organic compounds (e.g. dioxins) in the exhaust gas after treatment by the dust collection means can be reduced, provided the amount of the collected dust charged into a place having a high temperature (i.e. at least 800° C.) is adjusted to be a certain prescribed amount or more.

For the purpose of decreasing the concentration of chlorinated organic compounds in the exhaust gas after the treatment by the dust collection means with the lapse of time, the amount of the dust charged in step (B) may be set such that, at the time that the treatment by the dust collection means is commenced in step (A), the content of chlorinated organic compounds (e.g. dioxins) contained in the dust charged in step (B) is larger than the content of chlorinated organic compounds (e.g. dioxins) contained in the exhaust gas after the treatment by the dust collection means in terms of mass per unit time.

The treatment method of the present invention is preferably constituted such that the exhaust gas of the cement manufacturing equipment is treated using the dust collection means at a site where the temperature of the exhaust gas is 30 to 400° C.

At such a temperature, the amount of chlorinated organic compounds (e.g. dioxins) adsorbed on the dust in the exhaust gas of the cement manufacturing equipment is large, and hence the concentration of chlorinated organic compounds (e.g. dioxins) contained in the exhaust gas after the treatment by the dust collection means can be small.

A system for treating exhaust gas from cement manufacturing equipment according to the present invention comprises a suspension preheater (e.g. a suspension preheater constituted from a plurality of cyclones) for preheating cement raw materials, a rotary kiln for cement clinker firing connected to a bottom part of the suspension preheater, a pre-calciner provided as necessary (i.e. as optional equipment) between the suspension preheater and the rotary kiln, an exhaust gas passage for discharging exhaust gas generated during the cement clinker firing, and dust collecting equipment (e.g. a dust collector such as an electrostatic precipitator, a drier or mill capable of collecting dust disposed on the raw material inlet side (i.e. the gas outlet side) of the suspension preheater, and so on) that is connected to the exhaust gas passage and is for collecting dust containing chlorinated organic compounds (e.g. dioxins) in the exhaust gas, and further comprises dust feeding means (e.g. a combination of conveying equipment such as a screw conveyor and a feed rate controlling equipment such as a screw feeder) for charging at least part of the dust collected by the dust collecting equipment into at least one place selected from parts capable of reaching a temperature of at least 800° C. inside the suspension preheater, the pre-calciner (e.g. the main body of the pre-calciner, a cooler gas extraction duct connected to the main body of the pre-calciner, and so on), and the rotary kiln.

According to the exhaust gas treatment system of the present invention, dust containing chlorinated organic compounds (e.g. dioxins) in exhaust gas from cement manufacturing equipment is put inside the cement manufacturing equipment under conditions under which the chlorinated organic compounds (e.g. dioxins) can be pyrolyzed completely. As a result, the chlorinated organic compounds (e.g. dioxins) can be decomposed efficiently to be made harmless without providing special heating equipment for treating the chlorinated organic compounds.

The exhaust gas treatment system of the present invention may further comprise dust conveying means (e.g. a combination of conveying equipment such as a screw conveyor and a feed rate controlling equipment such as a screw feeder) for charging the remainder of the dust collected by the dust collecting equipment into a site (e.g. the raw material supply passage) closer to the material inlet side (i.e. the gas outlet side) than the parts inside the suspension preheater capable of reaching a temperature of at least 800° C.

If such a constitution is adopted, then even in the case that it is difficult to charge all of the collected dust into a place having a temperature of at least 800° C. such as the rotary kiln, the amount of collected dust to be treated by the system of the present invention can be increased by charging part of the collected dust into a place having a temperature of at least 800° C., and charging the remainder of the collected dust into a place having a temperature below 800° C.

In the exhaust gas treatment system of the present invention, the exhaust gas passage may be provided so as to be able to collect exhaust gas that has passed through the suspension preheater.

BRIEF DESCRIPTION OF THE DRAWINGS

FIG. 1 is a schematic drawing showing cement manufacturing system including an example of an exhaust gas treatment system of the present invention.

DESCRIPTION OF THE PREFERRED EMBODIMENTS

Following is a description of an exhaust gas treatment method and an exhaust gas treatment system of the present invention, with reference to FIG. 1. FIG. 1 is a schematic drawing showing cement manufacturing system including an example of the exhaust gas treatment system of the present invention.

In FIG. 1, cement raw materials such as limestone, clay, silica rock, iron slag, waste material (e.g. molding sand, slag, alumina sludge, bottom ash generated through the incineration of municipal refuse, etc.) and so on are dried in a drier 1, and are then pulverized and mixed together in a mill (i.e. raw material mill) 2. Fly ash is then added as necessary, and then the raw material mixture (i.e. cement raw meal) is fed into a suspension preheater 4 via a raw material supply passage 3.

Here, the suspension preheater 4 is for preheating the cement raw material mixture while carrying out heat exchange, and is constituted from a plurality of cyclones 4a, 4b, 4c and 4d. The temperature in the lowest stage cyclone 4d is generally 800 to 900° C.

In the suspension preheater 4, the cement raw material mixture is preheated while moving downward from the top stage cyclone 4a to the cyclone 4b and then the cyclone 4c, and after reaching the lowest stage cyclone 4d, is fed into a rotary kiln 5.

As shown in FIG. 1, a pre-calciner 6 may be additionally provided between the suspension preheater 4 and the rotary kiln 5. The pre-calciner 6 is provided to efficiently promote calcination (i.e. decarbonation reaction) of the cement raw material mixture. The temperature in the pre-calciner 6 is generally kept at 800 to 1,000° C. It should be noted that in the present invention, the pre-calciner 6 is provided as necessary, and is not essential.

There are no particular limitations on the type of the pre-calciner 6. For example, an SF pre-calciner, an MFC pre-calciner, an RSP pre-calciner, a KSV pre-calciner, a DD pre-calciner, an SLC pre-calciner or the like can be used.

The cement raw material mixture fed into the rotary kiln 5 is fired at a temperature of 1,000 to 2000° C. to produce clinker. The clinker discharged from the rotary kiln 5 is mixed with gypsum and so on, and is then finely pulverized in a finishing mill 7 to produce cement.

Exhaust gas, which is generated when the cement raw material mixture undergoes calcination (i.e. decarbonation reaction) in the rotary kiln 5 and the pre-calciner 6, flows into the suspension preheater 4 from the rotary kiln 5 and the pre-calciner 6, moves upward inside the suspension preheater 4, and after reaching the top stage cyclone 4a, flows into an exhaust gas passage 8 (shown as a dotted line in FIG. 1) connected to the top stage cyclone 4a. The exhaust gas then passes through the mill 2 and the drier 1 so as to act as a heat source. While passing through the mill 2 and the drier 1, some of the dust in the exhaust gas is removed. After that, the exhaust gas flows into a dust collector (a dust collection means) 9 from the exhaust gas passage 8, and treatment is carried out by the dust collector 9 to remove dust in the exhaust gas. The treated exhaust gas is then passed through a treated gas discharge passage 10, and is discharged into the atmosphere from a chimney 11. The exhaust gas flows into the mill 2 at a temperature of, for example, 200 to 450° C., and is discharged from the drier 1 at a temperature of, for example, 60 to 200° C.

In the present specification, 'cement manufacturing equipment' means, for example, the equipment comprising the drier 1, the mill 2, the raw material supply passage 3, the suspension preheater 4, the rotary kiln 5, the pre-calciner 6 (which may be omitted), and the finishing mill 7. It should be noted that the drier 1 and the mill 2 maybe combined into a single equipment.

The dust collector 9 is for collecting dust containing chlorinated organic compounds (e.g. dioxins) in the exhaust gas from cement manufacturing equipment. An electrostatic precipitator is generally used as the dust collector 9. Other examples of the dust collector 9 include a gravitational dust collector, an inertial dust collector, a centrifugal dust collector, and a filter type dust collector.

The dust collected by the dust collector 9 may contain chloride (e.g. alkaline metal chloride such as NaCl and KCl, and alkaline earth metal chloride such as $CaCl_2$), bromide (e.g. NaBr, KBr and soon) and brominated organic compounds. The total amount of chlorine-containing compounds and bromine-containing compounds in the dust to be charged by a dust feeding means 12 is preferably not more than 5 mass % in terms of oxides based on the mass of the dust.

The dust collector 9 is preferably installed at a site where the temperature of the exhaust gas discharged from the suspension preheater 4 has dropped to 30 to 400° C. (preferably 50 to 250° C.). In the case that the dust is collected at such a relatively low temperature, the amount of chlorinated organic compounds (e.g. dioxins) contained in the dust is larger than that at a high temperature, and hence the concentration of chlorinated organic compounds (e.g. dioxins) contained in the exhaust gas after the treatment by the dust collector 9 can be reduced. Such a reduction of concentration is convenient.

In the present invention, each of the exhaust gas passage 8 and the dust collector 9 can be divided into two portions (i.e. two exhaust gas passages and two dust collectors). In this case, part of the exhaust gas from the top stage cyclone 4a passes through a passage, flows into the mill 2, and then flows into a dust collector for treating the gas from the mill 2. The other part of the exhaust gas from the top stage cyclone 4a passes through the other passage, flows into the drier 1, and then flows into the other dust collector for treating the gas from the drier 1. The dust, which has been collected by the dust collector for treating the gas from the drier 1, generally contains chlorinated organic compounds in a higher concentration than the dust which has been collected by the dust collector for treating the gas from the mill 2, and hence is preferably charged into a place having a temperature of least 800° C. via a dust feeding means 12. It should be also noted that the dust, which has been collected on the downstream side in the dust collector for treating the gas from the drier 1, generally contains chlorinated organic compounds in the highest concentration.

The dust collected by the dust collector 9 and the other equipments (i.e. the drier land the mill 2), which is abbreviated to 'collected dust' in the present specification, generally contains approximately 0.01 to 0.05 ng-TEQ/g of dioxins, although this value varies with the type of the waste material constituting part of the cement raw materials.

Here, 'TEQ' (toxicity equivalency quantity) means the sum of the values obtained by multiplying the amount of each of homologues constituting the dioxin by the toxicity equivalency coefficient for that homologue. Toxicity equivalency coefficient is a value of toxicity relative to a value of 1 for 2,3,7,8-TeCDD, which is considered to be the most toxic dioxin.

In the present invention, all or part of the collected dust is charged into a place having a temperature of at least 800° C. inside the cement manufacturing equipment.

In the case that all of the collected dust is charged into a place having a temperature below 800° C. inside the cement manufacturing equipment, the following problem will arise.

In the case that the collected dust is charged into a place having a temperature below 800° C. inside the cement manufacturing equipment (e.g. the raw material supply passage 3, the top stage cyclone 4a of the suspension preheater 4, and so on), the collected dust passes through the suspension preheater 4 and the pre-calciner 6 and is fired in the rotary kiln 5 together with the cement raw material mixture.

However, in this case, some of the chlorinated organic compounds (e.g. dioxins) contained in the collected dust will separate away from the cement raw material mixture before being pyrolyzed in the bottom part (i.e. the cyclone 4d) of the suspension preheater 4, fly upward, flow into the exhaust gas passage 8 together with the exhaust gas, and once again become adsorbed on the dust while moving through the exhaust gas passage 8.

The chlorinated organic compounds (e.g. dioxins) adsorbed on the dust will once again go through the process of being collected in the mill 2, the drier 1 and the dust collector 9, and then being charged into the cement manufacturing equipment. This process will be repeated again and again.

In this way, the dioxins will repeatedly circulate between the cement manufacturing equipment comprising the suspension preheater 4 and soon and the exhaust gas treatment means comprising the mill 2, the drier 1, the dust collector 9 and soon. Accordingly, if waste material continues to be fed into the cement manufacturing equipment as part of the cement raw materials, the concentration of chlorinated organic compounds (e.g. dioxins) contained in the collected dust will progressively increase, and as a result the concentration of chlorinated organic compounds (e.g. dioxins) contained in the exhaust gas after being treated by the dust collector 9 will also progressively increase.

In the present invention, for the purpose of preventing the concentration of chlorinated organic compounds (e.g. dioxins) contained in the exhaust gas after being treated by the dust collector 9 and the concentration of chlorinated organic compounds (e.g. dioxins) contained in the dust in the drier 1 and the mill 2 from becoming too high, at least part of the collected dust is charged directly into a place having a temperature of at least 800° C. inside the cement manufacturing equipment, whereby pyrolysis of the chlorinated organic compounds (e.g. dioxins) is promoted.

In the present invention, the time for which the collected dust reside in a place having a temperature of at least 800° C. inside the cement manufacturing equipment is preferably at least 2 seconds. In the case that this residence time is at least 2 seconds, the chlorinated organic compounds such as dioxins can be pyrolyzed sufficiently. There are no particular limitations on the upper limit of the residence time, but this is generally not more than 1 minute. Also, there are no particular limitations on the upper limit of the heating temperature, but this is generally not more than 2,000° C.

Examples of the place having a temperature of at least 800° C. inside the cement manufacturing equipment into which the collected dust is charged include a part of the suspension preheater 4 that can reach a temperature of at least 800° C. (e.g. the lowest stage cyclone 4d, a duct connected to the cyclone 4d, and so on), the pre-calciner 6 (e.g. the main body of the pre-calciner, a cooler gas extraction duct connected to the main body of the pre-calciner, and so on), and the rotary kiln 5.

Among these places, the lowest stage cyclone 4d is favorable as a place for pyrolyzing the chlorinated organic compounds (e.g. dioxins, etc.) contained in the collected dust, because the temperature of this place is 800 to 900° C. as mentioned above. The cyclone 4c, which is the second stage cyclone from the bottom, can also be used as a place for charging the collected dust in the present invention, provided the temperature of this place is at least 800° C.

The pre-calciner 6, which is provided as necessary, is favorable as a place for pyrolyzing the chlorinated organic compounds (e.g. dioxins) contained in the collected dust, because the temperature of this place is 800 to 1,000° C. as mentioned above.

The rotary kiln 5 is more favorable as a place for pyrolyzing the chlorinated organic compounds (e.g. dioxins) contained in the collected dust, because the temperature of this place is 900 to 2,000° C. as mentioned above. In the case that the collected dust is charged in from the raw material inlet side (i.e. the kiln end portion side) of the rotary kiln 5, the temperature of the charging place is 1,000° C., and hence, considering that the direction of gas flow is from the rotary kiln 5 to the pre-calciner 6 and the suspension preheater 4, the collected dust resides under conditions of a temperature of at least 800° C. longer than the case of being charged into the pre-calciner 6. Moreover, in the case that the collected dust is charged in from the burner side (i.e. the kiln front portion side, or the clinker outlet side) of the rotary kiln 5, the temperature of the charging place is 900 to 2,000° C., and hence considering that the direction of gas flow is from the rotary kiln 5 to the pre-calciner 6 and the suspension preheater 4, the collected dust resides for a yet longer time under conditions of a temperature of at least 800° C. In the case of providing the charging place of the collected dust in an intermediate position between the raw material inlet side and the burner side of the rotary kiln 5, the collected dust resides under conditions of a temperature of at least 800° C. for a time enabling chlorinated organic compounds (e.g. dioxins) to be decomposed sufficiently.

In the present invention, it is possible to charge part of the collected dust into a place having a temperature of at least 800° C. inside the cement manufacturing equipment, and charge all or part of the remainder of the collected dust into a place having a temperature below 800° C. (e.g. the raw material supply passage 3, the cyclone 4a at the top of the suspension preheater 4, and so on) inside the cement manufacturing equipment.

The amount of the collected dust charged into a place having a temperature of at least 800° C., and the amount of the collected dust charged into a place having a temperature below 800° C., are set such that, under the assumption that the collected dust only continues to be fed into the system of the present invention, the concentration of chlorinated organic compounds (e.g. dioxins) in the exhaust gas after the treatment by the dust collector 9 decreases with the lapse of time. In other words, if the amount of collected dust charged into a place having a temperature below 800° C. is large, the concentration of chlorinated organic compounds (e.g. dioxins) in the exhaust gas after the treatment by the dust collector 9 may progressively increase, and hence to solve this problem, the amount of the collected dust charged into a place having a temperature of at least 800° C. is adjusted to be a certain prescribed amount or more.

To decrease the amount of chlorinated organic compounds (e.g. dioxins) in the exhaust gas after the treatment by the dust collector 9 with the lapse of time, the amount of the collected dust charged into a place having a temperature of at least 800° C. may be set such that, at the time that the treatment by the dust collector 9 is commenced, the content of chlorinated organic compounds (e.g. dioxins) contained in the collected dust charged into a place having a temperature of at least 800° C., which can be calculated as a value of the product of the concentration of dioxins contained in the collected dust and the amount of the collected dust to be charged, is greater than the content of chlorinated organic compounds (e.g. dioxins) contained in the exhaust gas after the treatment by the dust collector 9, which can be calculated as a value of the product of the concentration of dioxins in the exhaust gas and the amount of the exhaust gas, in terms of mass per unit time.

It is preferable that all of the collected dust is charged into a place having a temperature of at least 800° C., because circulation of chlorinated organic compounds (e.g. dioxins) in the exhaust gas treatment system will no longer occur, and hence the concentration of chlorinated organic compounds (e.g. dioxins) in the exhaust gas after treatment by the dust collector 9 reduces rapidly.

A dust feeding means 12 for charging collected dust collected by the dust collector 9 into a place having a temperature of least 800° C. inside the cement manufacturing equipment is constituted, for example, from a storage tank (not shown in FIG. 1) for storing the collected dust, conveying equipment (not shown in FIG. 1) for conveying the collected dust from the dust collector 9 to the storage tank, and charging equipment (not shown in FIG. 1) for charging the collected dust in the storage tank into the place having a temperature of at least 800° C. inside the cement manufacturing equipment at a prescribed feeding rate.

Examples of the conveying equipment include a screw conveyor, a bucket elevator, a trough chain conveyor, and an aeration trough conveyor. Each of these may be used alone, or two or more may be used in combination. The conveying equipment is preferably well sealed to prevent the collected dust from dispersion and causing deterioration in the working environment while being conveyed.

It is preferable that the charging equipment can adjust the amount of the collected dust to be charged. Examples of such equipment include a screw feeder, a belt feeder, a rotary feeder, a wing auto feeder, a circle feeder, and constant feedware.

Similar means to the above-mentioned dust feeding means 12 for charging collected dust into a place having a temperature of at least 800° C. can be used as the dust conveying means 13 for charging collected dust collected by the dust collector 9 into a place having a temperature below 800° C. inside the cement manufacturing equipment.

EXAMPLES

The present invention is explained referring to experimental Examples in the following description.

Example 1

Prescribed amounts of cement raw materials were fed into cement manufacturing equipment as shown in FIG. 1, and clinker was obtained by firing. The exhaust gas generated was treated by the electrostatic precipitator 9 and so on to obtain collected dust and treated exhaust gas. Initially, all of the collected dust was led into the raw material supply passage 3 via the dust conveying means 13.

The concentration (units: ng-TEQ/g) of dioxins in the collected dust and the concentration (units: ng-TEQ/m$^3$N) of dioxins in the treated exhaust gas at the initial time were measured. Obtained values were defined as the initial dioxin concentrations before charging the collected dust into the pre-calciner 6.

Next, the feeding of the collected dust into the raw material supply passage 3 was stopped, and all of the collected dust was conveyed to the vicinity of the pre-calciner 6, and was charged into the pre-calciner 6 at a feeding rate of 10 ton/hour using a wing auto feeder. The charging was continued until 28 days had passed (i.e. the end of the experiment).

The concentration (units: ng-TEQ/g) of dioxins in the collected dust when the collected dust was charged into the pre-calciner 6, and the concentration (units: ng-TEQ/m$^3$N) of dioxins in the exhaust gas after being treated by the dust collector 9 were measured at each of 3 days, 7 days and 28 days after starting the charging of the collected dust into the pre-calciner 6.

Both of the volume of exhaust gas discharged from the dust collector 9 per unit time, and the mass of collected dust discharged from the dust collector 9 per unit time were measured, and each of the amount of dioxins in the discharged exhaust gas per unit time and the amount of dioxins in the collected dust obtained per unit time was calculated by multiplying the above-mentioned concentration (units: ng-TEQ/m$^3$N or ng-TEQ/g) of dioxins by the measured value (i.e. the volume of the exhaust gas or the mass of the collected dust).

The measurement of the dioxin concentrations was carried out using the following methods.

Method of Measuring Dioxin Concentration in Exhaust Gas

The concentration of dioxins in the exhaust gas was measured in accordance with 'JIS K 0311: Analysis of dioxins in exhaust gas'.

Method of Measuring Dioxin Concentration in Collected Dust

The concentration of dioxins in the collected dust was measured in accordance with 'Japanese Ministry of Health and Welfare Notification No. 192, Jul. 3, 1992: Standard test methods for specially controlled general waste material and specially controlled industrial waste material—method stipulated in attached table no. 1'.

The results are shown in Tables 1 and 2.

Example 2

An experiment was carried out in a similar way as that of Example 1, except that part of the collected dust was charged into the pre-calciner 6 at 2 ton/hour, and the remainder of the collected dust was charged into the raw material supply passage 3 at 8 ton/hour. The results are shown in Tables 1 and 2.

Reference Example 1

An experiment was carried out in a similar way as that of Example 1, except that part of the collected dust was charged into the pre-calciner 6 at 0.5 ton/hour, and the remainder of the collected dust was charged into the raw material supply passage 3 at 9.5 ton/hour. The results are shown in Tables 1 and 2.

TABLE 1

| | Amount charged into pre-calciner | Measurement site | Units | Concentration of dioxins | | | |
|---|---|---|---|---|---|---|---|
| | | | | Before charging | After starting charging | | |
| | | | | | 3 days | 7 days | 28 days |
| Example 1 | 10 t/h | Exhaust gas | (ng-TEQ/m$^3$N) | 0.045 | 0.0021 | 0.000034 | — |
| | | Dust | (ng-TEQ/g) | 0.018 | 0.00082 | 0.000013 | — |
| Example 2 | 2 t/h | Exhaust gas | (ng-TEQ/m$^3$N) | 0.049 | 0.033 | 0.019 | 0.0011 |
| | | Dust | (ng-TEQ/g) | 0.015 | 0.010 | 0.0058 | 0.00033 |
| Reference Example 1 | 0.5 t/h | Exhaust gas | (ng-TEQ/m$^3$N) | 0.050 | 0.053 | 0.045 | 0.061 |
| | | Dust | (ng-TEQ/g) | 0.016 | 0.021 | 0.014 | 0.025 |

TABLE 2

| | Amount charged into pre-calciner | Measurement site | Units | Concentration of dioxins | | | |
|---|---|---|---|---|---|---|---|
| | | | | Before charging*$^1$ | After starting charging*$^2$ | | |
| | | | | | 3 days | 7 days | 28 days |
| Example 1 | 10 t/h | Exhaust gas | (ng-TEQ/h) | 10,125 | 462 | 8 | — |
| | | Dust | (ng-TEQ/h) | 180,000 | 8,219 | 134 | — |
| Example 2 | 2 t/h | Exhaust gas | (ng-TEQ/h) | 11,025 | 7,333 | 4,257 | 245 |
| | | Dust | (ng-TEQ/h) | 30,000 | 19,953 | 11,584 | 667 |
| Reference Example 1 | 0.5 t/h | Exhaust gas | (ng-TEQ/h) | 11,250 | 11,925 | 10,125 | 13,725 |
| | | Dust | (ng-TEQ/h) | 8,000 | 10,500 | 7,000 | 12,500 |

*$^1$The amount of dioxins in the collected dust is the amount obtained during the initial period of operation that all of the collected dust was being fed into the raw material supply passage.
*$^2$The amount of dioxins in the collected dust is the amount obtained at the site where the collected dust was charged into the pre-calciner.

As shown in Tables 1 and 2, in Examples 1 and 2, the concentration and the total amount of dioxins in the exhaust gas after treatment by the dust collector 9, and the concentration and the total amount of dioxins in the collected dust decreased with the lapse of time. It can be seen that the dioxins could be pyrolyzed efficiently to be made harmless using existing cement manufacturing equipment.

On the other hand, in Reference Example 1, it can be seen that, because the amount of the collected dust charged into the raw material supply passage 3 was large, the concentration and the total amount of dioxins in the exhaust gas after treatment by the dust collector 9, and the concentration and the total amount of dioxins in the collected dust did not decrease with the lapse of time.

What is claimed is:

1. A method for treating exhaust gas from cement manufacturing equipment comprising:
   (A) a step of treating exhaust gas from cement manufacturing equipment by using dust collection means to collect dust containing chlorinated organic compounds, and discharging the exhaust gas after the treatment by said dust collection means;
   (B) a step of charging at least part of the collected dust into a place having a temperature of at least 800° C. inside said cement manufacturing equipment; and
   (C) a step of charging the remainder of the dust from step (B) into a place having a temperature below 800° C. inside said cement manufacturing equipment.

2. The method for treating exhaust gas from cement manufacturing equipment according to claim 1, wherein the exhaust gas from said cement manufacturing equipment is treated using said dust collection means installed at a site where the temperature of the exhaust gas is 30 to 400° C.

3. A method for treating exhaust gas from cement manufacturing equipment comprising:
   (A) a step of treating exhaust gas from cement manufacturing equipment by using dust collection means to collect dust containing chlorinated organic compounds, and discharging the exhaust gas after the treatment by said dust collection means;
   (B) a step of charging at least part of the collected dust into a place having a temperature of at least 800° C. inside said cement manufacturing equipment; and
   (C) a step of charging the remainder of the dust from step (B) into a place having a temperature below 800° C. inside said cement manufacturing equipment;
   wherein the amount of the dust to be charged in step (B) is set such that, under conditions of supplying the dust continuously in each of step (B) and step (C), the concentration of chlorinated organic compounds in the exhaust gas after the treatment by said dust collection means decreases with the lapse of time for a period of time from the beginning of steps (B) and (C).

4. The method for treating exhaust gas from cement manufacturing equipment according to claim 3, wherein the amount of the dust to be charged in step (B) is set such that, at the time that the treatment by said dust collection means is commenced in step (A), the content of chlorinated organic compounds contained in the dust to be charged in step (B) is larger than the content of chlorinated organic compounds contained in the exhaust gas after the treatment by said dust collection means in terms of mass per unit time.

5. The method for treating exhaust gas from cement manufacturing equipment according to claim 3, wherein the exhaust gas from said cement manufacturing equipment is treated using said dust collection means installed at a site where the temperature of the exhaust gas is 30 to 400° C.

6. The method for treating exhaust gas from cement manufacturing equipment according to claim 4, wherein the exhaust gas from said cement manufacturing equipment is treated using said dust collection means installed at a site where the temperature of the exhaust gas is 30 to 400° C.

7. A system for treating exhaust gas from cement manufacturing equipment comprising a suspension preheater for preheating cement raw materials, a rotary kiln for cement clinker firing connected to a bottom part of said suspension preheater, an exhaust gas passage for discharging exhaust gas generated during the cement clinker firing, and dust collecting equipment that is connected to the exhaust gas passage and is for collecting dust containing chlorinated organic compounds in the exhaust gas;

wherein the system further comprises:
(a) dust feeding means for charging at least part of the dust collected by said dust collecting equipment into at least one place selected from parts inside said suspension preheater capable of reaching a temperature of at least 800° C., and said rotary kiln, and
(b) dust conveying means for charging at least part of the remainder of the dust collected by said dust collecting equipment into a place on a cement raw materials inlet side at a distance from the parts inside said suspension preheater capable of reaching a temperature of at least 800° C.

8. The system for treating exhaust gas from cement manufacturing equipment according to claim 7, wherein said exhaust gas passage is provided so as to be able to collect exhaust gas that has passed through said suspension preheater.

9. A system for treating exhaust gas from cement manufacturing equipment comprising a suspension preheater for preheating cement raw materials, a rotary kiln for cement clinker firing connected to a bottom part of said suspension preheater, a pre-calciner between said suspension preheater and said rotary kiln, an exhaust gas passage for discharging exhaust gas generated during the cement clinker firing, and dust collecting equipment that is connected to the exhaust gas passage and is for collecting dust containing chlorinated organic compounds in the exhaust gas;

wherein the system further comprises:
(a) dust feeding means for charging at least part of the dust collected by said dust collecting equipment into at least one place selected from parts inside said suspension preheater capable of reaching a temperature of at least 800° C., said pre-calciner, and said rotary kiln, and
(b) dust conveying means for charging at least part of the remainder of the dust collected by said dust collecting equipment into a place on a cement raw materials inlet side at a distance from the parts inside said suspension preheater capable of reaching a temperature of at least 800° C.

10. The system for treating exhaust gas from cement manufacturing equipment according to claim 9, wherein said exhaust gas passage is provided so as to be able to collect exhaust gas that has passed through said suspension preheater.

* * * * *